(12) United States Patent
Joseph et al.

(10) Patent No.: US 7,498,077 B2
(45) Date of Patent: *Mar. 3, 2009

(54) METAL MATRIX COMPOSITE STRUCTURES

(75) Inventors: Brian E. Joseph, Wheeling, WV (US); Douglas J. Merriman, Wheeling, WV (US); Robert Nolte, Wheeling, WV (US); Matthew M. Rowe, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/000,521

(22) Filed: Dec. 1, 2004

(65) Prior Publication Data

US 2005/0238868 A1    Oct. 27, 2005

Related U.S. Application Data

(63) Continuation-in-part of application No. 09/882,096, filed on Jun. 15, 2001.

(60) Provisional application No. 60/526,100, filed on Dec. 2, 2003, provisional application No. 60/526,101, filed on Dec. 2, 2003, provisional application No. 60/525,837, filed on Dec. 1, 2003.

(51) Int. Cl.
*B32B 3/26* (2006.01)

(52) U.S. Cl. .............. 428/313.9; 428/313.3; 428/457; 428/293.1; 428/293.7; 428/539.5

(58) Field of Classification Search .............. 428/457, 428/704, 539.5, 313.3, 313.9, 293.1, 293.7
See application file for complete search history.

(56) References Cited

U.S. PATENT DOCUMENTS

| | | | |
|---|---|---|---|
| 4,411,380 A | 10/1983 | McWithey et al. | |
| 4,482,912 A | 11/1984 | Chiba et al. | |
| 4,716,067 A * | 12/1987 | Moji et al. | 428/117 |
| 4,752,537 A * | 6/1988 | Das | 428/614 |
| 4,816,347 A | 3/1989 | Rosenthal et al. | |
| 4,820,355 A * | 4/1989 | Bampton | 148/535 |
| 4,891,408 A * | 1/1990 | Newman-Evans | 525/113 |
| 4,935,291 A * | 6/1990 | Gunnink | 428/213 |
| 5,407,727 A * | 4/1995 | Newell | 428/188 |
| 5,433,511 A | 7/1995 | Wei | |
| 5,435,226 A | 7/1995 | McQuilkin | |
| 5,439,627 A * | 8/1995 | De Jager | 264/129 |
| 5,968,671 A * | 10/1999 | Joseph | 428/611 |
| 6,630,093 B1 * | 10/2003 | Jones | 264/401 |
| 6,655,633 B1 * | 12/2003 | Chapman, Jr. | 244/123 |
| 2003/0129437 A1 | 7/2003 | Kawaguchi et al. | |

FOREIGN PATENT DOCUMENTS

| | | | |
|---|---|---|---|
| CA | 2255451 A1 * | 6/2000 | |
| WO | 92/15453 | 9/1992 | |
| WO | WO 92/15453 A | 9/1992 | |

* cited by examiner

*Primary Examiner*—Hai Vo
(74) *Attorney, Agent, or Firm*—Philip D. Lane

(57) ABSTRACT

A lightweight, high strength structure is described where a core material has a first and second metal matrix composite layer on surfaces of the core material. A sandwich type structure may be formed. The core material may be a solid material, a foam, a honeycomb structure, or may be a channeled material. The metal matrix composite layers may include fiber reinforced metal matrix composites.

9 Claims, 2 Drawing Sheets

METAL MATRIX COMPOSITE STRUCTURES

CROSS-REFERENCE TO RELATED APPLICATIONS

The present application is a continuation-in-part of and claims priority to U.S. application Ser. No. 09/882,096, filed Jun. 15, 2001, which is herein incorporated by reference in its entirety. Further, the present application claims priority to U.S. Provisional Patent Application No. 60/525,837, filed Dec. 1, 2003; U.S. Provisional Patent Application No. 60/526,100, filed Dec. 2, 2003; and U.S. Provisional Patent Application No. 60/526,101, filed Dec. 2, 2003, each of which are specifically herein incorporated by reference in their entirety.

This invention was made with Government support under contract number DAAD19-01-2-0006 awarded by the Army Research Laboratory. The Government has certain rights in the invention.

FIELD OF THE INVENTION

The invention is generally directed to metal matrix composite structures. More particularly, the invention is directed to sandwich-type metal matrix composite structures.

BACKGROUND OF THE INVENTION

Materials for use in aerospace and aircraft applications typically need to possess relatively high stiffness and strength yet be relatively light. The trend is for materials to be come stronger yet lighter. Strength for a part may be increased by increasing the size or thickness of the part. This approach leads to an increase in weight corresponding to the increase in size. Components fabricated from metal matrix composites, as opposed to monolithic materials, can increase the strength beyond that of the monolithic material alone, typically without significantly increasing the weight of the component. The fabrication of a component entirely out of a metal matrix composite can be complicated requiring molds specifically designed to form the component. Depending on the reinforcing material these parts can be expensive to produce. There is a need to increase the strength of a structure or component without significantly increasing the overall weight of the material.

SUMMARY OF THE INVENTION

The invention is generally directed to sandwich-type structures where a lightweight core material is strengthened by opposing layers of a metal matrix composite material. With these structures, the strength of the resulting structure is significantly increased above the strength of the core material alone without significantly increasing the weight of the structure.

In certain embodiments the invention may include a metal matrix composite structure having a core material with a first surface and a second surface. A first metal matrix composite layer may be attached to the first surface and a second metal matrix composite layer may be attached to the second surface. In certain embodiment, the first surface and the second surface may be generally opposing surfaces. In other embodiments, the first surface and the second surface may be about orthogonal to one another.

The first and/or second metal matrix composite layers may comprise a fiber reinforced metal matrix composite. The fiber reinforced metal matrix composite may include a matrix metal such as metal and metal alloys, for example, aluminum, aluminum alloys, magnesium, magnesium alloys, and the like. The fiber reinforced metal matrix composite may include a reinforcing fiber such as, but not limited to, aluminum oxide fibers, basalt fibers, glass fibers, quartz fibers, boron fibers, silicon carbide fibers, or carbon fibers. In certain embodiments the first metal matrix composite layer and the second metal matrix composite layer may each comprise a fiber reinforced metal matrix composite. Further, the first metal matrix composite layer and the second metal matrix composite layer may each comprise a fiber reinforced metal matrix composite comprising an aluminum matrix metal and an alumina reinforcing fiber. Still further, the metal matrix composite layers may comprise discontinuous reinforcement particles.

The metal matrix composite may include a core that has a foam structure, such as, a carbon foam, a metal foam, or a polymer foam. Further, the core may have a honeycomb structure. Still further, the core may have a continuous linear shape along a length. The core may include a tube with a cross-sectional shape, such as, a square, a rectangle, a regular polygon, or an irregular polygon. The core may be made from a material such as aluminum, titanium, steel, iron, magnesium, alloys for the corresponding metal, or other metals and metal alloys.

Another embodiment of the invention includes a metal matrix composite structure that has a tubular core with a first surface and a second surface. A first fiber reinforced metal matrix composite layer may be attached to said first surface, and a second fiber reinforced metal matrix composite layer may be attached to the second surface. The first and second fiber reinforced metal matrix composite layers may each comprise alumina fibers embedded in a matrix metal, where the matrix metal includes aluminum.

Still further, the invention may include a metal matrix composite structure with a foam core having a first surface and a second surface where a first fiber reinforced metal matrix composite layer may be attached to the first surface, and a second fiber reinforced metal matrix composite layer may be attached to the second surface. The first and second fiber reinforced metal matrix composite layers may each have alumina fibers embedded in a matrix metal, where the matrix metal includes aluminum.

In yet another embodiment, the invention may include a metal matrix composite structure with a honeycomb core having a first surface and a second surface where a first fiber reinforced metal matrix composite layer may be attached to the first surface, and a second fiber reinforced metal matrix composite layer may be attached to the second surface. The first and second fiber reinforced metal matrix composite layers may each have alumina fibers embedded in a matrix metal, where the matrix metal includes aluminum.

Still further, an embodiment may include a metal matrix composite structure with a solid core having a first surface and a second surface where a first fiber reinforced metal matrix composite layer may be attached to the first surface, and a second fiber reinforced metal matrix composite layer may be attached to the second surface. The first and second fiber reinforced metal matrix composite layers may each have alumina fibers embedded in a matrix metal, where the matrix metal includes aluminum.

DETAILED DESCRIPTION OF EMBODIMENTS OF THE INVENTION

The invention is generally directed to a sandwich-type structure where a lightweight and possibly flexible core material has a metal matrix composite on opposing sides of the core material, thereby producing a sandwich structure that has greater strength and stiffness that that of the core material alone without a significant increase in overall weight.

Figure 1:
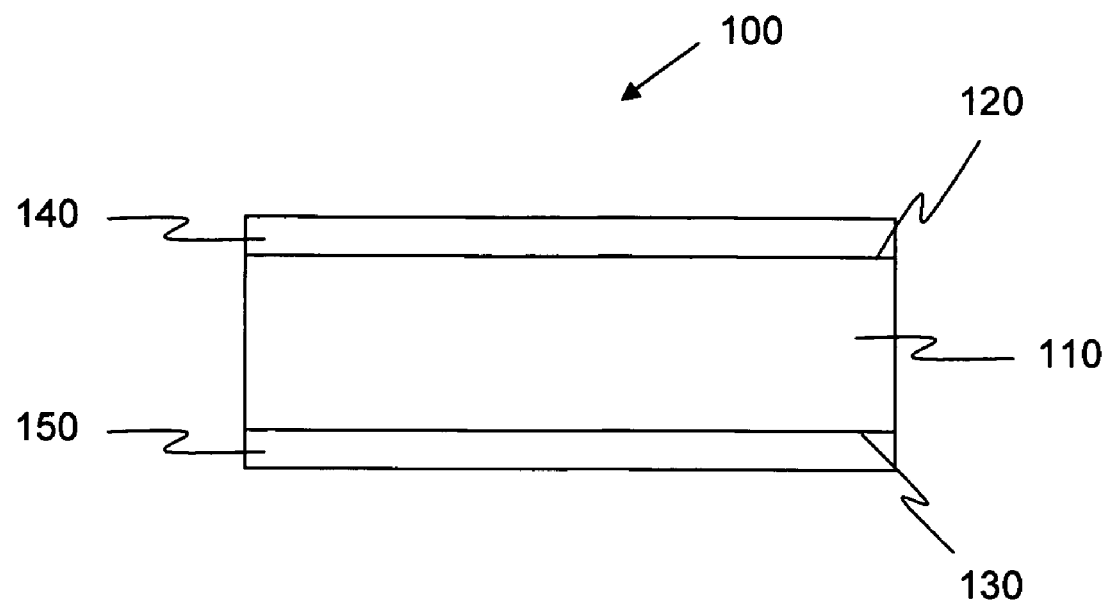
FIG. 1 is a diagrammatic view of an embodiment of the invention.

With reference now to FIG. 1, there is shown a metal matrix composite structure in accordance with an embodiment of the invention and given the reference numeral 100. The structure 100 has a core material 110 with first surface 120 and a second surface 130. A first metal matrix composite layer 140 is attached to the first surface 120 and a second metal matrix composite layer 150 is attached to the second surface 120. The first surface 120 and second surface 130 may be opposing surfaces as shown in FIG. 1 or they may be at any angle to one another including orthogonal to one another, depending on the application.

The structure of the core material may vary widely. The structure of the core material may include, but is not limited to, a solid, a porous structure, a foam, a honeycomb structure, a corrugated structure, a channeled material having at least one channel running along a length of the material, and other similar structures.

The composition of the core material is not particularly limited and may be virtually any material that can support the metal matrix composite layers. Examples of suitable core materials include virtually any metal or metal alloy, including, but not limited to, aluminum, titanium, steel, iron, magnesium, aluminum alloys, titanium alloys, magnesium alloys, and other metals and metal alloys. Further the composition of the core material may further include, but is not limited to, carbonaceous materials, polymeric materials, cellulose materials, paper, cardboard, wood, balsa wood, polymer foams, carbon foams, metallic foams, and the like.

The metal matrix composite layers may include placing strips of metal matrix composite tape adjacent to one another across the surface of the core material. Alternatively, only a single strip of metal matrix composite tape may be used across selected regions of the core material. In other embodiments, the metal matrix composite layers may include more than one layer of metal matrix composite tapes. Successive layers of metal matrix composite tapes may be laid-up until the desired thickness of the first and/or second metal matrix composite layer is achieved.

The metal matrix composite may comprise any metal matrix composite that provides properties compatible with the mechanical and environmental requirements of the application in which the structures of the present invention will be utilized. Suitable metal matrix composites may utilize continuous fibers, discontinuous fibers, or particulates as the reinforcing material and a metal or metal alloy as the matrix material.

In certain embodiments, the metal matrix composites are continuous fiber reinforced metal matrix composites, including tapes, wires, and the like. Continuous fiber reinforced metal matrix composites generally have continuous fibers embedded in a matrix metal. The matrix metal of these metal matrix composites is preferably a light weight metal and may comprise, but is not limited to, aluminum, aluminum alloys, magnesium, magnesium alloys, and the like. The continuous fiber reinforcement of such metal matrix composites may include, but is not limited to, aluminum oxide fibers, basalt fibers, glass fibers, quartz fibers, boron fibers, silicon carbide fibers, carbon fibers, and the like. Such continuous fiber reinforcement may be oriented parallel to the length of the metal matrix composite. Other continuous fiber orientations can be utilized. For example, the fiber orientation can be transverse, or any orientation between parallel and transverse, to the length of the metal matrix composite. Metal matrix composites may be produced in a number of sizes and is available commercially as a tape in widths of 0.25 to 1.25 inches and thicknesses of about 0.008 inches to about 0.030 inches (METPREG™, Touchstone Research Laboratory, Ltd., Tridelphia, W.Va.).

The use of the continuous fiber reinforced metal matrix composites is advantageous as such metal matrix composites can exhibit tensile strengths, compressive strengths, and moduli of elasticity typically greater than conventional materials of similar size or weight. Such beneficial mechanical properties may impact the properties of the structures of the present invention to provide for structures having mechanical properties superior to those of the core material alone.

The metal matrix composite layers may be attached to the core materials by any method that will secure the metal matrix composite layers in place. Mechanical connectors, adhesives, solder, brazing, welding, and the like are all suitable ways to attach the metal matrix composites to the core material. Methods for consolidating the metal matrix composite layers and the core material include vacuum bagging, where the materials are laid-up in their desired configuration and placed in a vacuum bag. A vacuum is created in the bag by which the laid up materials are compressed by the action of the ambient atmospheric pressure outside the bag. The vacuum bag may also be heated to a desired temperature to assist in the consolidation. Other methods for assembling the structures of the invention may include hot pressing and hot isostatic pressing.

Figure 2:
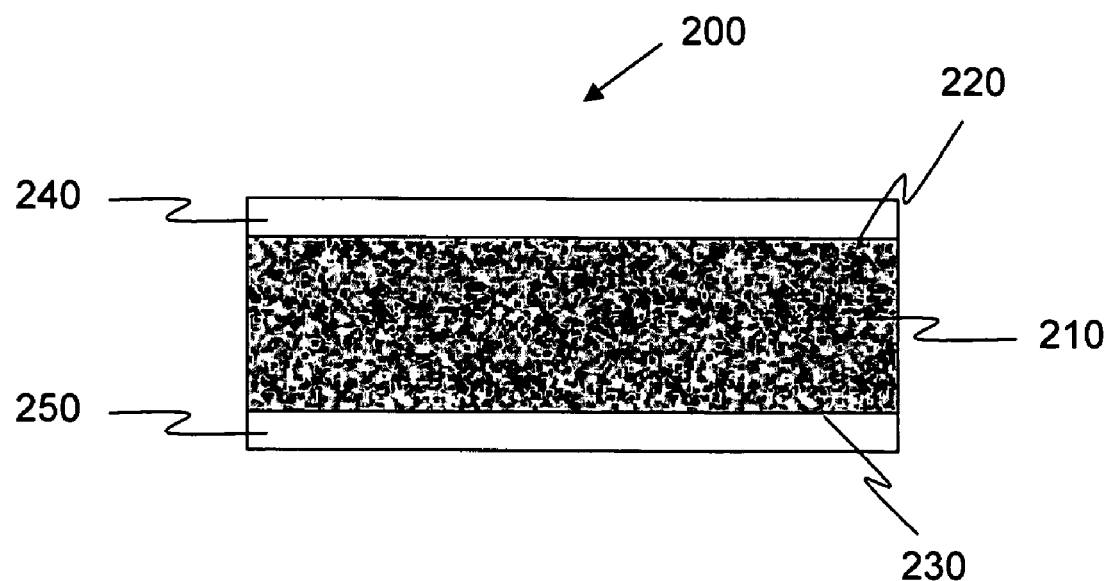
FIG. 2 is a diagrammatic view of another embodiment of the invention.

With reference now to FIG. 2, there is shown another embodiment of the invention having the reference numeral 200. In this embodiment the core material 210 has a foam-like structure with a first surface 220 and a second surface 230. A first metal matrix composite layer 240 is attached to the first surface 220 and a second metal matrix composite layer 250 is attached to the second surface 230. The materials for the metal matrix composite and core material may include those previously described. The foam core material may further include, carbon foam, metallic foams, polymer foams, and the like. Virtually any foam material may be used as long as it can provide surfaces to support the metal matrix composite layers.

Figure 3:
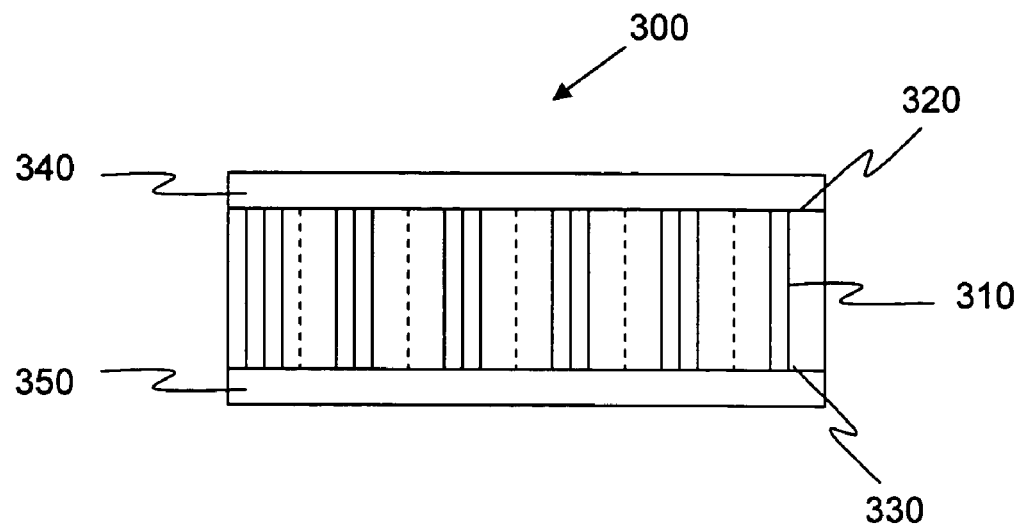
FIG. 3 is a diagrammatic view of yet another embodiment of the invention.

FIG. 3 shows yet another embodiment of the invention and has the reference numeral 300. In this embodiment, the core material 310 has a honeycomb-like structure with a first surface 320 and a second surface 330. A first metal matrix composite layer 340 is attached to the first surface 320 and a second metal matrix composite layer 350 is attached to the second surface 330. The materials for the metal matrix composite and core material may include those previously described. In this embodiment, the honeycomb channels are oriented vertically and are generally orthogonal to the first and second metal matrix composite layers 340 and 250. Honeycomb structures as the core material are advantageous because they are typically lightweight and when combined with the metal matrix composite layers, produce a very strong, yet light weight structure.

Figure 4:
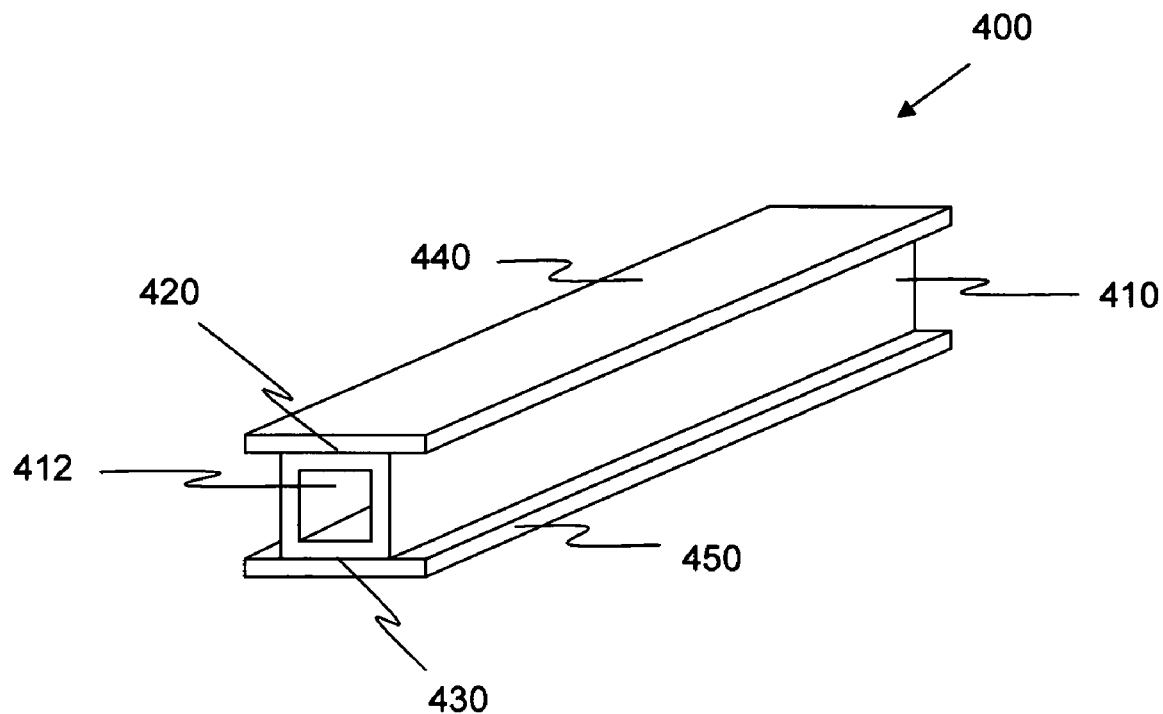
FIG. 4 is a perspective view of still another embodiment of the invention.

With reference now to FIG. 4, there is shown another embodiment of the invention depicted by the reference numeral 400. In this embodiment, the core material 410 has at least one channel 412 running along the length of the core material 410. The core material 410 has a first surface 420 and a second surface 430. A first metal matrix composite layer 440 is attached to the first surface 420 and a second metal matrix composite layer 450 is attached to the second surface 430. The compositions for the metal matrix composite and core material may include those previously described. In certain embodiments, the core material 310 is a relatively malleable material such as 3003 aluminum or other similar alloys. The core material may be bent or otherwise adapted to a desired configuration, followed by placement of the metal matrix composite layers to strengthen the configuration of the core material.

While certain embodiments of the invention have been described in detail, the above examples are not intended to limit the invention in any way.

What is claimed is:

1. A metal matrix composite structure comprising:
a tubular core material comprising a metal having a first surface and a second surface wherein the second surface is extending along the length of said tubular core material, wherein said tubular core defines at least one channel running along the length of said tubular core material, and wherein said tubular core has a cross-sectional shape selected from the group consisting of a square, a rectangle, a regular polygon, and an irregular polygon;
a first metal matrix composite layer attached to said first surface; and a second metal matrix composite layer attached to said second surface, wherein said second metal matrix composite layer comprises metal matrix composite tape having continuous reinforcing fibers comprising aluminum oxide fibers, wherein all the continuous reinforcing fibers are oriented substantially parallel to the length of said second metal matrix composite layer, and wherein the length of the second metal matrix composite layer extends along the length of the tubular core material.

2. The metal matrix composite structure of claim 1, wherein said first surface and said second surface are opposing surfaces.

3. The metal matrix composite structure of claim 1, wherein said first surface and said second surface are about orthogonal to one another.

4. The metal matrix composite structure of claim 1, wherein said first metal matrix composite layer comprises metal matrix composite tape having continuous reinforcing fibers.

5. The metal matrix composite structure of claim 1, wherein said metal matrix composite tape comprises a matrix metal selected from the group consisting of aluminum, aluminum alloys, magnesium, and magnesium alloys.

6. The metal matrix composite structure of claim 1, wherein said metal matrix composite tape comprises a matrix metal selected from the group consisting of aluminum and an aluminum alloy.

7. The metal matrix composite structure of claim 1, wherein said metal matrix composite tape comprises an aluminum matrix metal and an alumina reinforcing fiber.

8. The metal matrix composite structure of claim 1, wherein said first metal matrix composite layer comprises metal matrix composite tape having continuous reinforcing fibers comprising an aluminum matrix metal and an aluminum oxide reinforcing fiber.

9. The metal matrix composite structure of claim 1, wherein said metal comprises a material selected from the group consisting of aluminum, titanium, steel, iron, magnesium, aluminum alloys, titanium alloys, and magnesium alloys.

* * * * *